United States Patent
Azeredo et al.

(10) Patent No.: US 11,760,486 B2
(45) Date of Patent: Sep. 19, 2023

(54) HOIST SYSTEM AND PROCESS FOR SWAY CONTROL

(71) Applicant: Breeze-Eastern LLC, Whippany, NJ (US)

(72) Inventors: Ian Azeredo, Whippany, NJ (US); Patrick Doyle, Whippany, NJ (US); Brianna Stewart, Whippany, NJ (US)

(73) Assignee: BREEZE-EASTERN LLC, Whippany, NJ (US)

( * ) Notice: Subject to any disclaimer, the term of this patent is extended or adjusted under 35 U.S.C. 154(b) by 327 days.

(21) Appl. No.: 16/857,947

(22) Filed: Apr. 24, 2020

(65) Prior Publication Data

US 2021/0197970 A1 Jul. 1, 2021

Related U.S. Application Data

(60) Provisional application No. 62/837,909, filed on Apr. 24, 2019.

(51) Int. Cl.
*B64D 1/22* (2006.01)
*B64C 27/04* (2006.01)
*B66C 1/40* (2006.01)
*B66D 1/48* (2006.01)

(52) U.S. Cl.
CPC ............... *B64D 1/22* (2013.01); *B64C 27/04* (2013.01); *B66C 1/40* (2013.01); *B66D 1/485* (2013.01)

(58) Field of Classification Search
CPC .. B64D 1/22; B64C 27/04; B66C 1/40; B66D 1/485
See application file for complete search history.

(56) References Cited

U.S. PATENT DOCUMENTS

| 3,510,107 | A | 5/1970 | Fidler | |
| 2008/0282583 | A1* | 11/2008 | Koellner | E02F 3/304 |
| | | | | 37/348 |
| 2012/0263566 | A1* | 10/2012 | Taylor | E02F 3/437 |
| | | | | 701/50 |
| 2015/0019087 | A1* | 1/2015 | Knuth | E02F 9/2025 |
| | | | | 701/50 |

(Continued)

FOREIGN PATENT DOCUMENTS

JP 3241591 B2 * 10/1997

OTHER PUBLICATIONS

JP3241591B2—Translation (Year: 1997).*
International Search Report and Written Opinion issued in PCT/US20/29729, dated Oct. 7, 2020.

*Primary Examiner* — Frederick M Brushaber
(74) *Attorney, Agent, or Firm* — BakerHostetler

(57) ABSTRACT

An aircraft hoist system includes hoist equipment arranged in an aircraft, the hoist equipment including a motor, a cable, and a hook portion. The aircraft hoist system also includes at least one sensor configured to obtain measurements and a processor configured to analyze the measurements from the at least one sensor. The aircraft hoist system also includes the processor configured to determine motor control signals to control the motor based on an analysis of the measurements from the at least one sensor to reduce sway and/or oscillations of the cable while lifting a load. The aircraft hoist system also includes the processor configured to control the motor to lift the load with the cable based on the determined motor control signals.

18 Claims, 9 Drawing Sheets

(56) References Cited

U.S. PATENT DOCUMENTS

| | | | |
|---|---|---|---|
| 2015/0122761 A1* | 5/2015 | Ford | B66C 13/46 |
| | | | 212/276 |
| 2016/0009393 A1 | 1/2016 | Repp et al. | |
| 2017/0096797 A1* | 4/2017 | Robertson | E02F 9/2037 |
| 2017/0167115 A1* | 6/2017 | Lee | E21C 27/30 |
| 2018/0066414 A1* | 3/2018 | Voelz | E02F 3/308 |
| 2018/0252921 A1* | 9/2018 | Rantala | G02B 27/0172 |
| 2018/0282130 A1 | 10/2018 | Kale et al. | |

* cited by examiner

HOIST SYSTEM AND PROCESS FOR SWAY CONTROL

CROSS-REFERENCE TO RELATED APPLICATIONS

This application claims the benefit of U.S. Provisional Application No. 62/837,909 filed on Apr. 24, 2019, which is hereby incorporated by reference in its entirety for all purposes as if fully set forth herein.

FIELD OF THE DISCLOSURE

The disclosure relates to a hoist system for sway control. The disclosure further relates to a hoist process for sway control. The disclosure further relates to an airborne hoist system for sway control. The disclosure further relates to an airborne hoist process for sway control. The disclosure further relates to an aircraft mounted hoist system for sway control. The disclosure further relates to an aircraft mounted hoist process for sway control.

BACKGROUND

Helicopter hoist equipment typically includes a lifting device such as a hoist, which is attached to the helicopter, a hoist cable, and a hook located at a distal end of the hoist cable for direct or indirect attachment to a person, animal, and/or object (load) for rescue, transport, lift, and/or the like. The helicopter hoist equipment usually has a rotary drum for winding in and out the hoist cable that serves to lift or transport the load. A crew member in the helicopter typically controls the helicopter hoist equipment including raising and lowering of the hook.

The environment in which the helicopter or other aircraft operates as well as the lifting device and the load that is being lifted is highly dynamic and includes or is subjected to various forces, accelerations, movements, and/or the like. A common issue with this environment is that the load may sway or oscillate back and forth, side to side, or combination thereof below the helicopter presenting a risk to safe operation of the helicopter as well as presenting a safety issue for the load.

Accordingly, a system and process to control the sway of the load and an associated portion of the lifting device is needed to ensure safe operation of the aircraft and a safety of the load.

SUMMARY OF THE DISCLOSURE

The foregoing needs are met, to a great extent, by the disclosure, wherein in one aspect a hoist system and hoist process for sway control are provided. In one aspect, the disclosure is directed to a hoist system and hoist process for sway control that may be intended to modify existing human commands for hoist actuation and hoist movement in terms of scale input, and not directly actuate a hoist motor or movement otherwise. In one aspect, the disclosure is directed to a hoist system and hoist process for sway control that replaces the manual controls with an electronic interface. Further in this aspect, the movements of controls of the electronic interface are converted to electronic signals, the movements of the controls being provided by a user. Furthermore, the hoist system and/or the hoist process receives the electronic signals and determines how to operate the hoist system to provide an ordered response to the movements of the controls of the electronic interface.

In one aspect, the system and process of the disclosure is configured for mitigating oscillations when lifting a load. In one aspect, the system and process of the disclosure may be configured to implement sway control by the hoist system by speeding up and slowing down the lift velocity. In one aspect, the system and process of the disclosure may be configured to implement sway control by the hoist system by speeding up and slowing down the lift velocity during an arc of swaying motion. In one aspect, the system and process of the disclosure may be configured to slow the lift velocity at one point of the swing, and increase the lift velocity at another point of the swing. In one aspect, the system and process of the disclosure may be configured to slow the lift velocity at one end of the swing, and increase the lift velocity at another end of the swing. In this regard, the system and process of the disclosure may be configured to determine the position of the load and may make automatic adjustments to lift speed and the like thus reducing errors associated with human factors. In particular, the system and process of the disclosure may be configured with sensors on the hoist system and an electronic module or processor that processes outputs of the sensors and controls the hoist system accordingly. Additionally, the system and process of the disclosure may be configured to determine the position and/or the velocity of the load and may make automatic adjustments to lift acceleration and/or lift deceleration. Moreover, the system and process of the disclosure may be configured to determine the position, the velocity, and/or acceleration/deceleration of the load and may make automatic adjustments to lift position, lift velocity, and/or lift acceleration/deceleration.

In one aspect, the system and process of the disclosure is configured such that uncontrolled oscillations and spin may be mitigated via the use of an electronic control module incorporated within the hoist or standalone as mounted between pendant and pilot controls and the hoist or otherwise integrated within other systems. In one aspect, the system and process of the disclosure is configured such that oscillation may be mitigated by automatic adjustments to pay-in commands in order to remove human factors which may contribute to excessive oscillations. In one aspect, the system and process of the disclosure may be configured to include fleet angle sensors, speed sensors, load sensors, and/or the like providing output that may be used with algorithms for automatic speed adjustments during the oscillation swing for hook sway control. In one aspect, the system and process of the disclosure may be configured to have a modified operation for mission types which require immediate extraction. In this regard, the modified operation may allow for a greater amount of oscillation and/or a greater amount of sway to ensure a faster lift. In one aspect, the system and process of the disclosure may be configured to be selectively turned off for mission types which require immediate extraction. In one aspect, the system and process of the disclosure may be configured to mitigate uncontrollable spin by reducing a time an external load is statically positioned under the aircraft and susceptible to rotation effects from aircraft downwash. Current techniques for avoidance of spin and oscillation are manually controlled by pilot and operator. In one aspect, the system and process of the disclosure may allow for reduction in human factors and set-up for unmanned cable control for improved sway control, oscillation control, sway reduction, oscillation reduction, and/or the like.

One general aspect includes an aircraft hoist system, including hoist equipment arranged in an aircraft, the hoist equipment including a motor, a cable, and a hook portion; at least one sensor configured to obtain measurements including at least one of following: a load measurement, a cable position movement measurement, a cable movement measurement, an aircraft movement measurement, and an airspeed measurement. The aircraft hoist system also includes a processor configured to analyze the measurements from the at least one sensor. The aircraft hoist system also includes the processor configured to determine motor control signals to control the motor based on an analysis of the measurements from the at least one sensor to reduce sway and/or oscillations of the cable while lifting a load. The aircraft hoist system also includes the processor configured to control the motor to lift the load with the cable based on the determined motor control signals, where the at least one sensor includes at least one of the following: a load measurement sensor, a cable movement measurement sensor, a cable position measurement sensor, an aircraft movement measurement sensor, and an airspeed measurement sensor. Other aspects include corresponding computer systems, apparatus, and computer programs recorded on one or more computer storage devices, each configured to perform the actions of the methods.

One general aspect includes a method of controlling an aircraft hoist system, including implementing hoist equipment in an aircraft, the hoist equipment including a motor, a cable, and a hook portion; obtaining measurements from at least one sensor by measuring with the at least one sensor at least one of following: a load measurement, a cable position movement measurement, a cable movement measurement, an aircraft movement measurement, and an airspeed measurement. The method of controlling also includes analyzing the measurements with a processor from the at least one sensor. The method of controlling also includes determining motor control signals with the processor for controlling the motor based on an analysis of the measurements from the at least one sensor to reduce sway and/or oscillations of the cable while lifting a load. The method of controlling also includes controlling the motor with the processor to lift the load with the cable based on the determined motor control signals, where the at least one sensor includes at least one of the following: a load measurement sensor, a cable movement measurement sensor, a cable position measurement sensor, an aircraft movement measurement sensor, and an airspeed measurement sensor. Other aspects of this include corresponding computer systems, apparatus, and computer programs recorded on one or more computer storage devices, each configured to perform the actions of the methods.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

Reference herein to an "aspect," "example," or similar formulations means that a particular feature, structure, operation or characteristic described in connection with the "aspect" or "example," is included in at least one implementation in this description. Thus, the appearance of such phrases or formulations is this application may not necessarily all refer to the same example. Further, various particular features, structures, operations, or characteristics may be combined in any suitable manner in or more examples.

DETAILED DESCRIPTION

Figure 1:
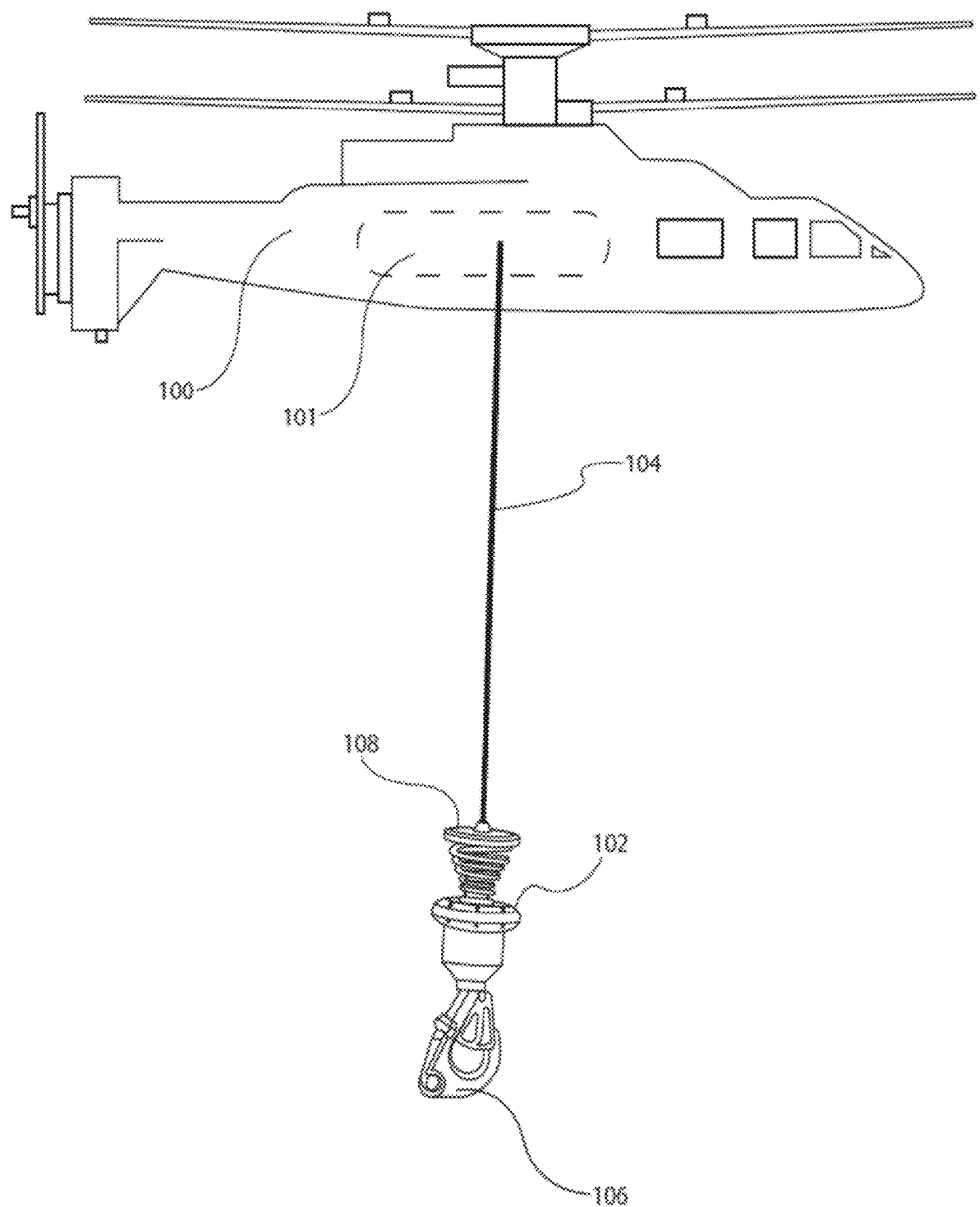
FIG. 1 illustrates a helicopter with an exemplary helicopter hoist system in accordance with aspects of the disclosure.

The disclosure will now be described with reference to the drawing figures, in which like reference numerals refer to like parts throughout. Aspects of the disclosure advantageously provide a hoist system and hoist process for sway control.

FIG. 1 shows a helicopter with an exemplary helicopter hoist system in accordance with aspects of the disclosure. In particular, FIG. 1 shows a helicopter 100 with a hoist system 101, which may be used for search and rescue missions, transport missions, combat insertion missions, combat extraction missions, and/or the like. In certain aspects, the hoist system 101 may be implemented as a Helicopter Flight Rescue System (HFRS), a Helicopter External Transport System (HETS), and/or the like. As shown in FIG. 1, the hoist system 101 may be positioned on an upper side of the aircraft, and may be attached directly or indirectly to the helicopter 100. In other aspects, the hoist system 101 may be mounted to a bottom of the helicopter 100, may be mounted to a side of the helicopter 100, may be mounted internally to the helicopter 100, and/or the like.

Although FIG. 1 depicts a helicopter as the exemplary aircraft, the hoist system 101 and its associated principles/methodologies described herein, are not limited to helicopters, and may be applied to any airborne platform. For example, the hoist system 101 may be attached directly or indirectly to a cargo helicopter (not shown), such as mounted underneath an aircraft fuselage, mounted to a tilt rotor aircraft, aerial crane, flying crane and/or the like. The hoist system 101 may also be coupled to an autonomous or remote controlled aircraft, such as an unmanned aerial vehicle, unmanned aircraft system (UAV/UAS), a drone, fixed wing aircraft, and the like. Of course, the hoist system 101 may also be implemented in static configurations, non-aircraft based configurations, and/or the like.

Referring to FIG. 1, the hoist system 101 may include a hook 102 and a cable 104. The hook 102 may be positioned between the cable 104 and a hook portion 106. That is, the hook 102 may be connected to the cable 104 at its upper end, and may be connected to the hook portion 106 (or another object) on its lower end. As appreciated by one skilled in the art with the benefit of this disclosure, the hook 102 may be connected directly or indirectly to the cable 104 and the hook portion 106. For instance, as shown in FIG. 1, a spring-interface device 108 may be connected between the cable 104 and the hook 102. In other aspects, the cable 104 may be connected directly to the hook portion 106. In other aspects, the cable 104 may be connected to the hook portion 106 through the spring-interface device 108.

Figure 2:
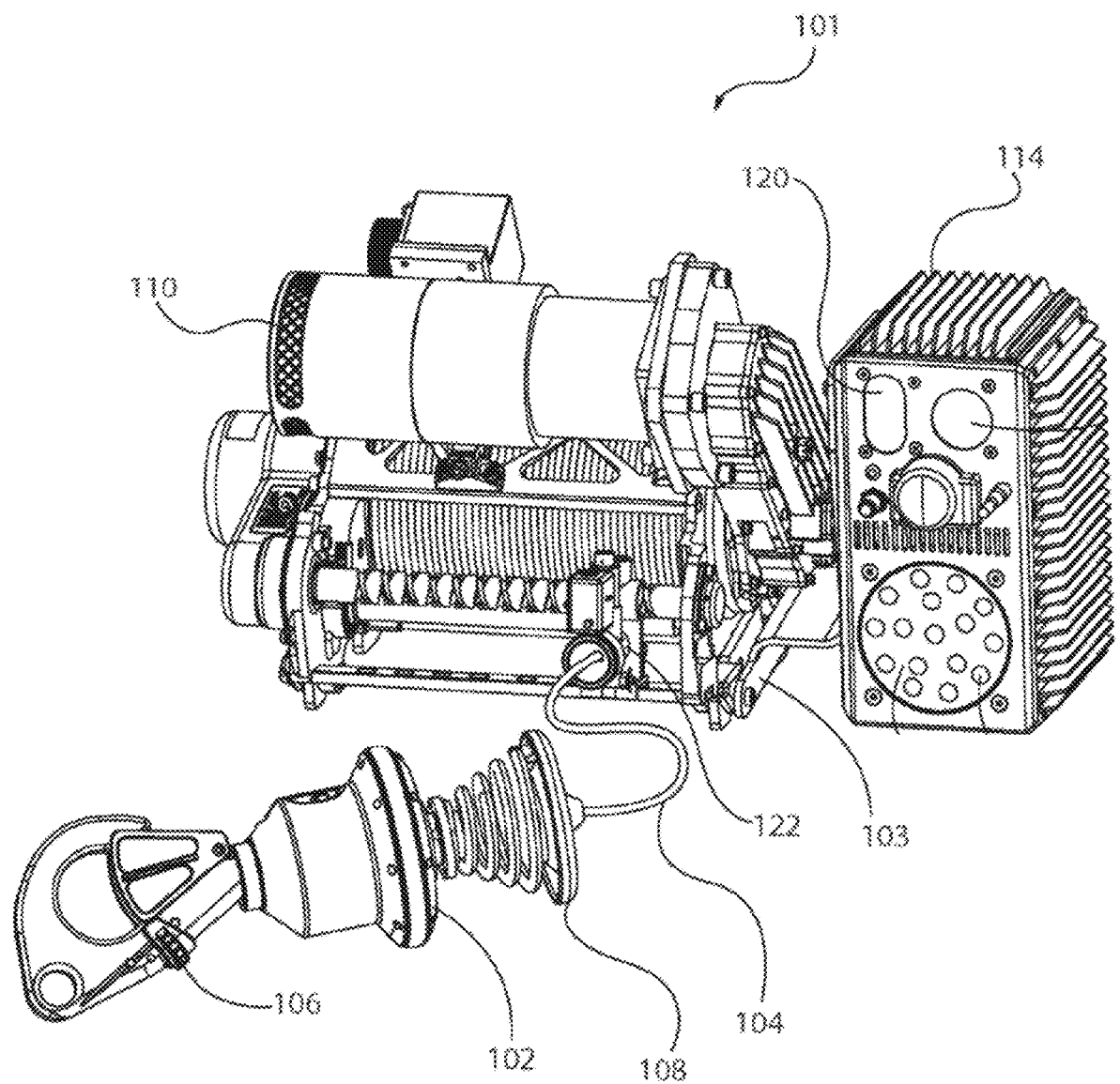
FIG. 2 illustrates an enlarged view of components of the helicopter hoist system shown in FIG. 1.

FIG. 2 illustrates an enlarged view of components of the helicopter hoist system shown in FIG. 1. In particular, FIG. 2 illustrates an enlarged view of the hoist system 101 shown in FIG. 1, with the cable 104 in a generally retracted position. The hoist system 101 may include a frame 103 on which the hoist equipment (i.e., the cable 104, the hook 102, the hook portion 106, and/or a motor 110). The hoist system 101 may include an electronic system 114 that may include a housing. The electronic system 114 may include lighting, lighting systems, lasers, laser systems, cameras, camera systems, communication systems, communication equipment, electronics and processing equipment, and/or the like.

The hoist system 101 may include a motor 110. In one example, the motor 110 may be a brushless motor, which may provide smoother raising and lowering of the cable 104. In another aspect, the motor 110 may include a high-performance variable-speed brushless permanent magnet rotary servomotor, with Universal AC or DC power input. In some aspects, the torque output may range between 5.6 Nm and 13.9 Nm. As appreciated by those skilled in the art, the torque range may vary and may be less than or more than 5.6 Nm and 13.9 Nm. In addition, any suitable motor or motors may be implemented as part of the hoist equipment. Additionally, the hoist system 101 may include a transmission, a rotary drum, and/or the like.

The electronic system 114 also may include a host of other electronic equipment, which are not shown in FIG. 2, but are described in more detail below including communication systems, antenna, processing/control systems including image-processing systems, power-management systems, control systems, motor control systems, sensor systems, and/or the like.

Figure 3:
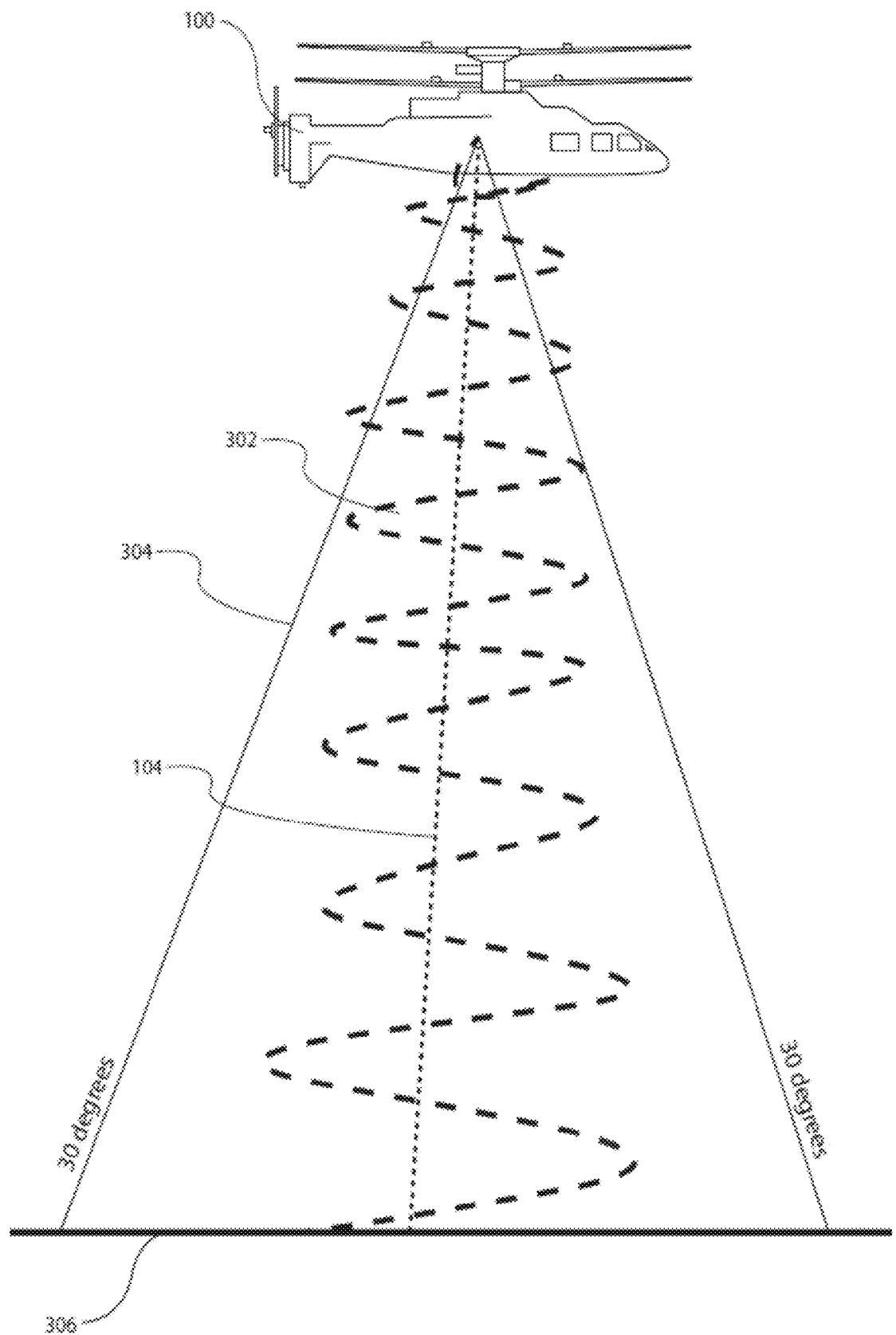
FIG. 3 illustrates a path of a load being lifted to a helicopter without sway control.

FIG. 3 illustrates a path of a load being lifted to a helicopter without sway control. In particular, FIG. 3 illustrates the helicopter 100 lifting a load (not shown) that is attached to the cable 104. In this regard, FIG. 3 illustrates the path 302 the load makes as it is lifted to the helicopter 100 without sway control. In this regard, the path 302 illustrates substantial sway and/or oscillation and the path 302 approaches and at times exceeds a 30° angle shown by line 304 as illustrated in FIG. 3 as the load is lifted from the ground 360 to the helicopter 100. The operation illustrated in FIG. 3 presents a risk to safe operation of the helicopter 100 as well as presenting a safety issue for the load.

Figure 4:
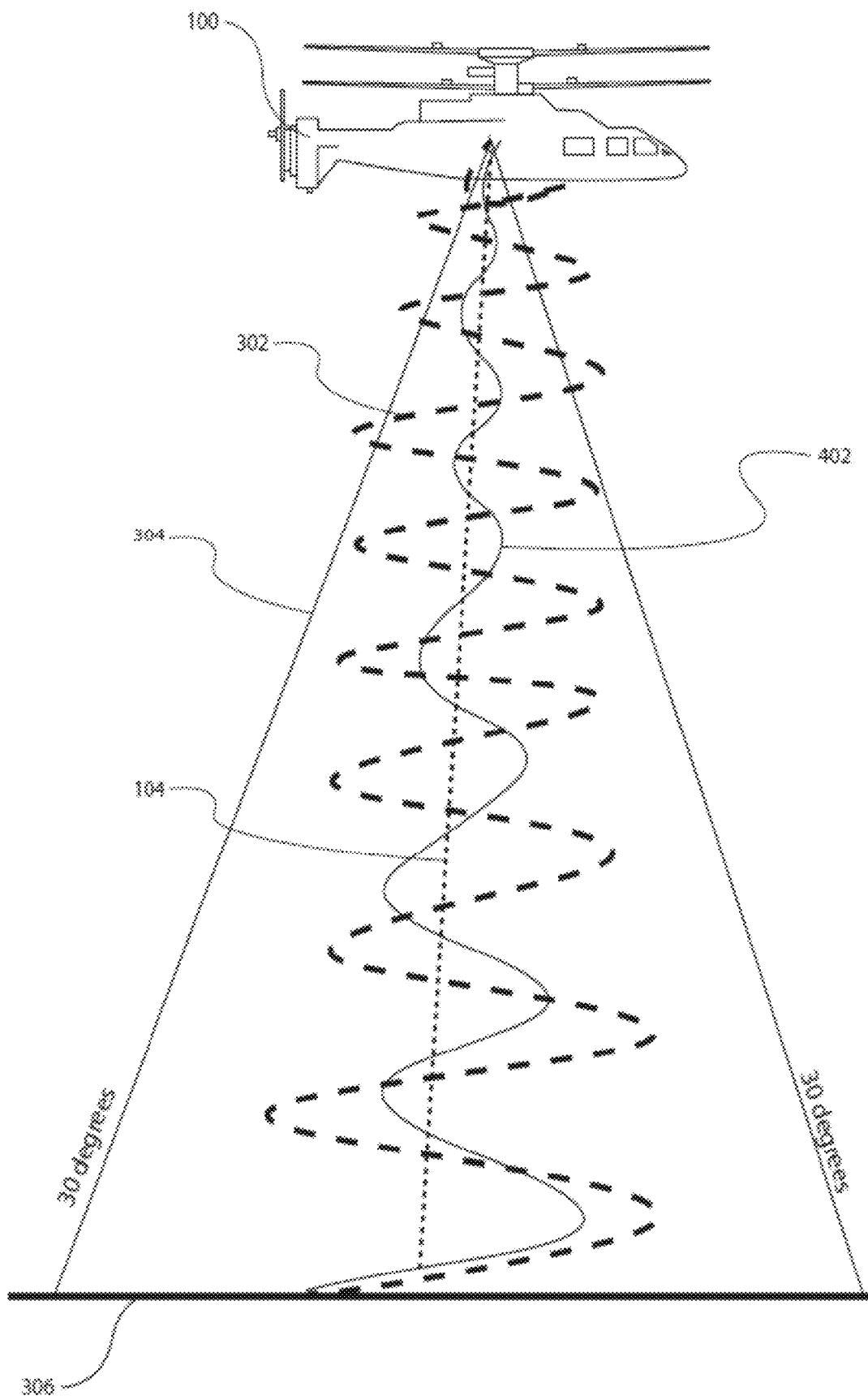
FIG. 4 illustrates a path of a load being lifted to a helicopter without sway control superimposed on a load being lifted to a helicopter with sway control in accordance with aspects of the disclosure.

FIG. 4 illustrates a path of a load being lifted to a helicopter without sway control superimposed on a load being lifted to a helicopter with sway control in accordance with aspects of the disclosure. In particular, FIG. 4 illustrates the helicopter 100 lifting a load (not shown) on the cable 104. In this regard, FIG. 4 illustrates the path 302 the load makes as it is lifted to the helicopter 100 without sway control as described above. FIG. 4 further illustrates a path 402 the load makes as it is lifted to the helicopter 100 with sway control implemented as described below. The operation illustrated in FIG. 4 utilizing sway control decreases a risk to safe operation of the helicopter 100 as well as increases a safety for the load.

Figure 5:
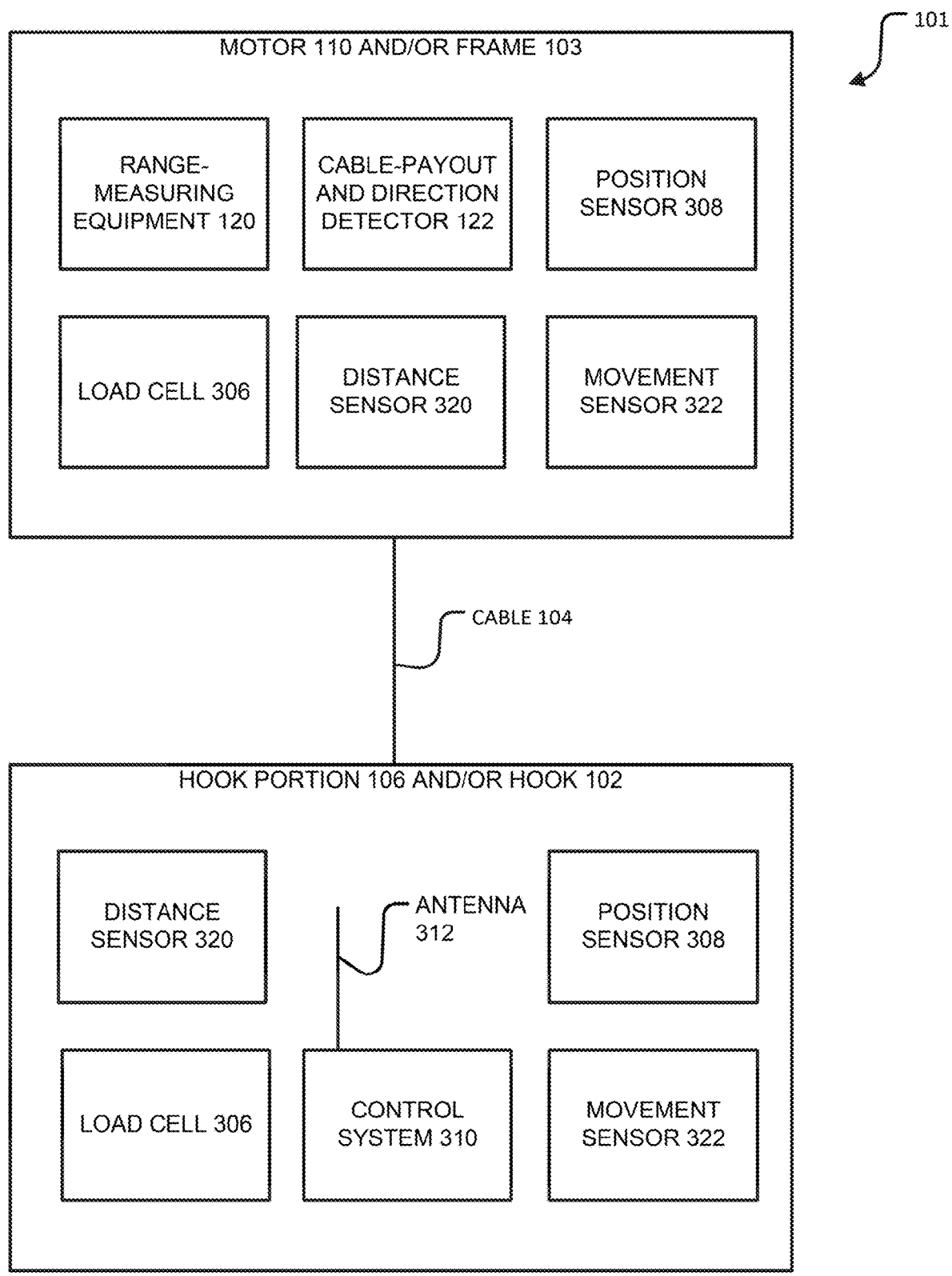
FIG. 5 illustrates a block diagram illustrating select components of an example helicopter hoist system in accordance with aspects of the disclosure.

FIG. 5 illustrates a block diagram illustrating select components of an example helicopter hoist system in accordance with aspects of the disclosure.

Load Measurement Sensors

The hoist system 101 may include one or more sensors to measure a load on the cable 104, the hook portion 106, and/or the hook 102. In one aspect, the hoist system 101 may include a load cell 306 associated with the motor 110, the frame 103, and/or the like. In one aspect, the load cell 306 may be integrated in the hook 102 and/or the hook portion 106. However, the one or more sensors to measure a load on the cable 104, the hook portion 106, and/or the hook 102 may be implemented using other sensor technology and/or arranged in other locations.

The load cell 306 may be implemented as a transducer that is used to create an electrical signal whose magnitude is directly proportional to or a function of the force being measured. The load cell 306 may be implemented as a hydraulic, a pneumatic, and/or a strain gauge load cell. The load cell 306 measures a force provided by the load. That is, the load cell 306 is positioned in a load path associated with the hook 102, the hook portion 106, and/or cable 104. As appreciated by one skilled in the art after having the benefit of this disclosure, the load cell 306 can have any construction and be positioned in hook 102, the hook portion 106, along cable 104 (FIG. 1) path, the motor 110, the frame 103, or the like in any suitable manner to acquire load data. In certain aspects, the load cell 306 may measure at least in part roll, pitch, and/or yaw associated with the aircraft and/or the hook 102, the hook portion 106, and/or cable 104.

Cable Movement Measurement

The hoist system 101 may include one or more sensors to measure a movement of the cable 104, the hook portion 106, and/or the hook 102 with respect to the helicopter 100. In one aspect, the hoist system 101 may include a position sensor 308 associated with the motor 110, the frame 103, the cable 104, the hook portion 106, the hook 102, and/or the like. In one aspect, the hoist system 101 may associate the position sensor 308 with the motor 110 and measure movement the cable 104 or the like that may include swaying, oscillation, and/or the like. The position sensor 308 may be implemented as Capacitive transducer, Capacitive displacement sensor, Eddy-current sensor, Ultrasonic sensor, Grating sensor, Hall effect sensor, Inductive non-contact position sensors, Laser Doppler vibrometer (optical), Linear variable differential transformer (LVDT), Multi-axis displacement transducer, Photodiode array, Piezo-electric transducer (piezo-electric), Potentiometer, Proximity sensor (optical), Rotary encoder (angular), String potentiometer, string encoder, cable position transducer, Linear encoder, Rotary encoder, and/or the like.

In one aspect, the position sensor 308 may be integrated in the hook 102 and/or the hook portion 106 and may be implemented as an inertial measurement unit (IMU). In one aspect, the distance sensor 320 may be integrated in the hook 102 and/or the hook portion 106 and may be implemented as a location determination device implemented as global navigation satellite system (GNSS) receiver. In one aspect, the position sensor 308 may be integrated in the hook 102 and/or the hook portion 106 and measure swaying and/or oscillation of the hook 102, the cable 104, and/or the hook portion 106.

Cable and/or Hook Distance Measurement

The hoist system 101 may include one or more sensors to measure a length or distance of the cable 104, the hook portion 106, and/or the hook 102 from the helicopter 100. In one aspect, the hoist system 101 may include a distance sensor 320 associated with the motor 110, the frame 103, the cable 104, the hook portion 106, the hook 102, and/or the like. In one aspect, the hoist system 101 may associate the distance sensor 320 with the motor 110 and measure rotations of the motor 110 to determine a length of the cable 104 or the like. In one aspect, the hoist system 101 may associate the distance sensor 320 with the motor 110 and determine a length of the cable 104 payout or the like. The distance sensor 320 may be implemented as Capacitive transducer, Capacitive displacement sensor, Eddy-current sensor, Ultrasonic sensor, Grating sensor, Hall effect sensor, Inductive non-contact position sensors, Laser Doppler vibrometer (optical), Linear variable differential transformer (LVDT), Multi-axis displacement transducer, Photodiode array, Piezo-electric transducer (piezo-electric), Potentiometer, Proximity sensor (optical), Rotary encoder (angular), String potentiometer, string encoder, cable position transducer, Linear encoder, Rotary encoder, and/or the like.

In one aspect, the distance sensor 320 may be integrated in the hook 102 and/or the hook portion 106 and may be implemented as an inertial measurement unit (IMU). In one aspect, the distance sensor 320 may be integrated in the hook 102 and/or the hook portion 106 and may be implemented as a location determination device implemented as global navigation satellite system (GNSS) receiver. In one aspect, the hoist system 101 may also include range-measuring equipment 120 (such as a laser-range finder) for determining the distance of the hook 102 from the helicopter 100, and as well as the distance of objects or ground/water from helicopter 100. In one aspect, the hoist system 101 may also include a cable-payout and direction detector 122, which measures the distance the cable 104 is extended and a direction the cable 104 is moving (i.e., up or down).

Aircraft Movement Measurement

The hoist system 101 may include a movement sensor 322 to measure movement of the helicopter 100. In one aspect, the movement sensor 322 may be implemented as an inertial measurement unit (IMU). In one aspect, the movement sensor 322 may be implemented as a location determination device implemented as global navigation satellite system (GNSS) receiver. In one aspect, the movement sensor 322 may be implemented as an inertial measurement unit (IMU) and a location determination device implemented as global navigation satellite system (GNSS) receiver. In other aspects, the hoist system 101 may receive movement information from the helicopter 100.

Airspeed Measurement and Other Flight Dynamics Data

The hoist system 101 may determine an airspeed measurement of the helicopter 100. In one aspect, the hoist system 101 may receive an airspeed measurement from the helicopter 100. In one aspect, the airspeed measurement may be determined from a pitot-static system. The pitot-static system may include a system of pressure-sensitive instruments that determine an aircraft airspeed, Mach number, altitude, and/or altitude trend. Additionally, the hoist system 101 may measure other flight dynamics and/or receive other flight dynamics data from the helicopter 100 or another associated system. In this regard, the other flight dynamics data may include roll, roll rate, pitch, pitch rate, yaw, yaw rate, and/or the like data.

In some aspects, the hook 102 may include a control system 310. The control system 310 may be configured to measure and transmit the load on the hook, altitude of the assembly above ground or water, position and/or directionality of the assembly, and/or other information utilizing sensors as described above or other types of sensors known to one of ordinary skill in the art. In some aspects, the load and sensor data may be stored in any suitable-memory-storage device within hook 102. In one aspect, an antenna 312 together with the transceiver serves as a means for communicating wirelessly between the control system 310 and other systems located in helicopter 100 or elsewhere utilizing a communication channel as defined herein. A data port may also serve as a means for communicating with other computing devices including memory storage devices.

Figure 6:
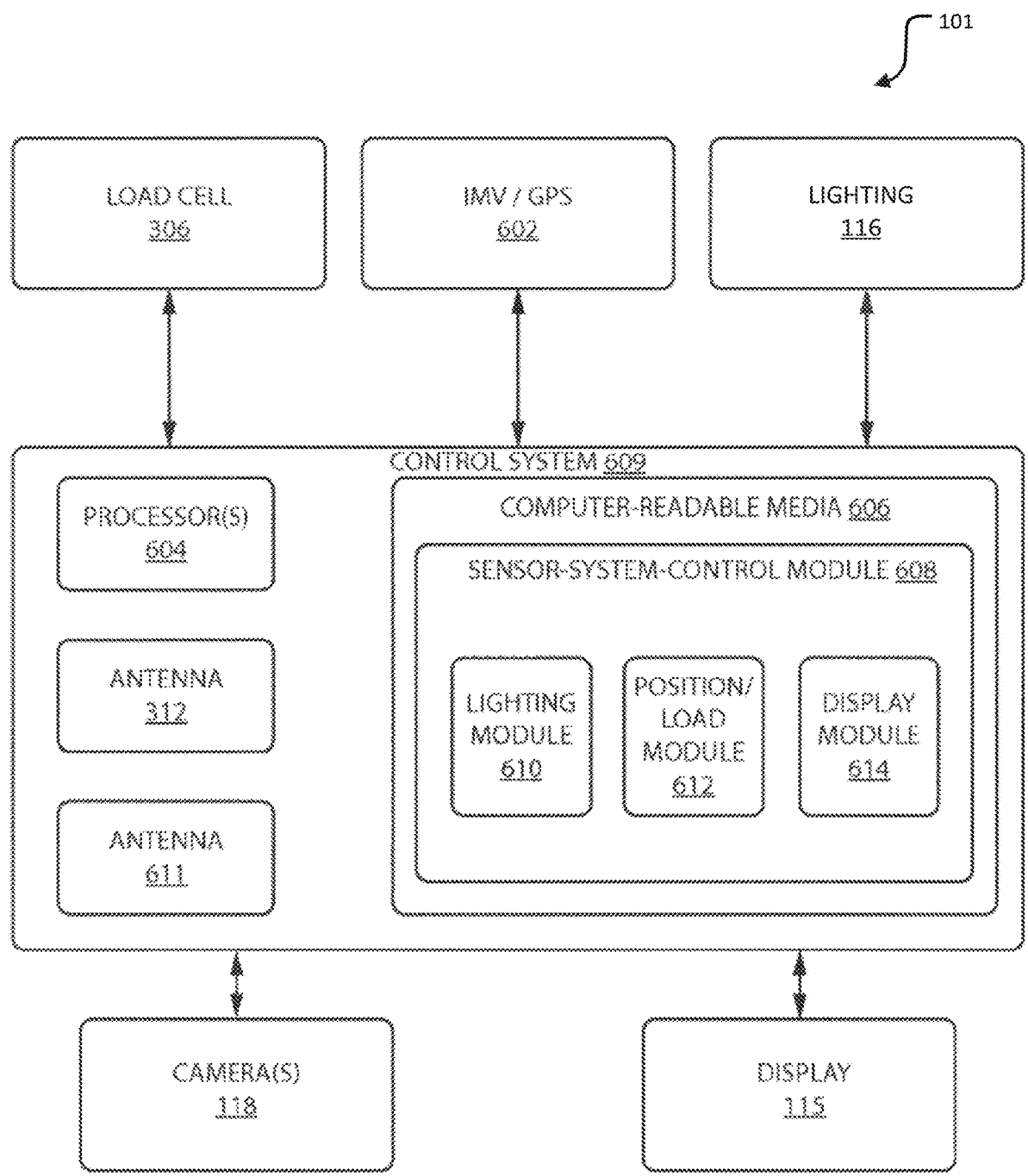
FIG. 6 illustrates a block diagram illustrating select components of an example helicopter hoist system in accordance with aspects of the disclosure.

FIG. 6 illustrates a block diagram illustrating select components of an example helicopter hoist system in accordance with aspects of the disclosure. In particular, FIG. 6 is a block diagram illustrating select components of the hoist system 101 that facilitate the interoperability of the hoist system 101. As shown in FIG. 6, the hoist system 101 may include a control system 609, which may control and monitor the hook 102 and other systems/devices associated with the hoist system 101 as described in the disclosure.

Although the control system 609 is illustrated as a discrete block, it is appreciated by those skilled in the art with the benefit of this disclosure, that the control system 609 may reside at various times across different components of the hoist system 101. For instance, the control system 609 may be implemented and reside as a component of the hook 102, may be also be implemented and reside in the electronic system 114, across other devices remote from the hook 102 and the electronic system 114, and/or the like.

Thus, in a general sense, those skilled in the art will recognize that the various control systems described in the hoist system 101 can be implemented individually or collectively by a wide range of electrical, mechanical, optical, processing (including hardware, software, firmware, and/or virtually any combination thereof), and various combinations of the foregoing.

Furthermore, various elements located in the hook 102 may communicate via antenna 312 in the hook 102 with components resident in the electronic system 114 or other component remote from the electronic system 114, such as located in the helicopter 100. An antenna 611 implemented with a transceiver associated with the hoist system 101 may provide a mechanism for transmitting and receiving data to/from the hook 102, and other devices. Thus, even though the control system 310 is shown apart from the control system 609, it is appreciated by those skilled in the art with the benefit of this disclosure that the control system 310 may form an integral part of the control system 609 for the hoist system 101. In addition, although wireless communication via antennae is described, it is appreciated that wired communication may be used between the hook 102 and other elements of the hoist system 101.

As depicted in FIG. 6, the control system 609 represents any suitable computer device(s) having one or more processor(s) 604 and the ability to access the computer-readable media 606 to execute instructions or code that controls the hook 102, as well as other devices associated with the hoist system 101. The processor(s) 604 may be located in the electronic system 114 and may be embodied as any suitable electrical circuit, computing processor including special integrated circuits, ASICs, FPGAs, microcontrollers, processor, co-processor, microprocessor, controllers, or other processing means. The processor(s) 604 may also be embedded in the hook 102.

The processor(s) 604 may be distributed in more than one computer system and over a network utilizing a transceiver operating on a communication channel as defined herein (not shown). Examples of the computer systems may include, but are not limited to, a server, personal computer, distributed computer systems, or other computing devices having access to processors and computer-readable medial. Further, although not shown, any number of system busses, communication and peripheral interfaces, input/output devices, and other devices may be included in the control system 609 (including the control system 310), as appreciated by those skilled in the art.

Still referring to FIG. 6, the computer-readable media 606 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory or non-transmission medium that can be used to store information for access by a computing device. In one aspect, the computer-readable media 606 stores a sway control process (Box 700) as described below.

In other examples, the computer-readable media 606 may include communication media that may embody computer readable instructions, data structures, program modules, or other data in a modulated data signal, such as a carrier wave, or other transmission mechanism. In one aspect, the computer-readable media 606 may be implemented as a computer program product having instructions and configured to be executed by the control system 609 and/or the processor(s) 604.

Further, the computer-readable media 606 may be local and/or offsite to computer systems (not shown). For instance, one or more portions of, or all of data or code stored in the computer-readable media 606, may be accessed from a computer-storage medium local to and/or remote to the control system 609, such as from a storage medium connected to a network.

Resident in the computer-readable media 606 may be one or more operating systems (not shown), and any number of other program applications or modules in the form of computer-executable instructions and/or logic which are executed on the processor(s) 604 to enable processing of data or other functionality.

Still referring to FIG. 6, the control system 609 may be configured with a sensor-system-control module 608 that may be maintained in the computer-readable media 606. In one example, the sensor-system-control module 608 may be implemented as code in the form of computer-readable instructions that execute on the processor(s) 604. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in the computer-readable media 606 may be implemented across one or more computers in a cloud computing environment, on a local device or system, or on a combination of both. The following discussion does not limit the implementation of code stored in the computer-readable media 606 to any particular device or environment.

The sensor-system-control module 608 may include components contained in the computer-readable media 606. In one example, the sensor-system-control module 608 includes: a lighting module 610, a position/load module 612, and a display module 614.

In one aspect, the position/load module 612 facilitates a mode of operation of the control system 609 in which the position/load module 612 monitors measurements made by the load measurement sensors such as the load cell 306, the cable movement measurement sensors such as the distance sensor 320, the cable-payout and direction detector 122 and/or the range-measuring equipment 120, the aircraft movement measurement sensors such as the movement sensor 322, airspeed measurement sensors, other flight dynamics sensors, and/or the like. In one aspect, the position/load module 612 facilitates a mode of operation of the control system 609 in which the position/load module 612 monitors measurements made by an inertial measurement unit (IMU) and/or global positioning unit (GPS) (collectively referred to herein as IMS/GPS 602) located in the hook 102 and/or the electronic system 114. The position/load module 612 may also record these measurements (i.e., data) generated by the IMS/GPS 602, and transmit these measurements to the hoist system 101 as well as other monitoring devices, such as located in the helicopter 100.

The IMS/GPS 602 may be in communication with the position/load module 612 and enable the control system 609 to monitor a location and/or relative motion of the hook 102 and/or the hook portion 106 in three-dimensional coordinate space relative to the helicopter.

Thus, the combination of one or more of the load measurement sensors such as the load cell 306, the cable movement measurement sensors such as the distance sensor 320, the cable-payout and direction detector 122 and/or the range-measuring equipment 120, the aircraft movement measurement sensors such as the movement sensor 322, airspeed measurement sensors, other flight dynamics sensors, the load cell 306, the IMS/GPS 602 under control of the control system 609 (including control system 310 individually or in combination with system 609 as a whole), and the like allow for complete mapping of the hook 102—and hook load—in 3D coordinate space and relative to the airframe (helicopter and/or hoist). With cable payout information, the hoist cable fleet angle and/or the like may also be calculated. This data may be used to understand the load conditions on the hoist and helicopter airframe. Put differently, the IMS/GPS 602 under control of the control system 609 (including the control system 310 individually or in combination with the system 609 as a whole) may allow for mapping of the position, velocity, sway, oscillation, acceleration, and/or the like of the hook 102, the hook portion 106, and/or the load relative to the ground and/or aircraft.

In addition, the IMS/GPS 602 under control of the control system 609 (including the control system 310 individually or in combination with the system 609 as a whole) may use the real-time load and acceleration data from the hook 102 to adjust the payout of the cable 104 (via hoist equipment such as the cable 104, the hook 102, and the motor 110) to actively dampen vibrations imparted to the hoist equipment and aircraft, actively reduce sway to the hoist equipment and aircraft, actively reduce oscillation to the hoist equipment and aircraft, and/or the like.

Thus, this data allows for monitoring health and maintenance of the hoist system, and the number of hoist system cycles, and the ability to predict component wear and plan maintenance. For the helicopter, this data allows for complete dynamic load mapping for the structural design of helicopter hoist mounts/interfaces. Real-time dynamic load information supplied by the control system 609 also allows for active hoist mounts that optimize the load transfer and energy management between the hook and the helicopter, providing for reduced shock loads on hoist components, helicopter mounts, and any personnel or cargo on the hook. Optimizing the dynamic response of the helicopter and hoist as a system can provide inputs to helicopter-flight controls for an optimized response during load transfer and flight.

The dynamic response of the system may change based on cable length (i.e., pendulum effect on the cable), and the ability to optimize the helicopter system-level response with these sensor inputs may provide for improved flight control and stability during operations and cargo transfers.

Figure 7:
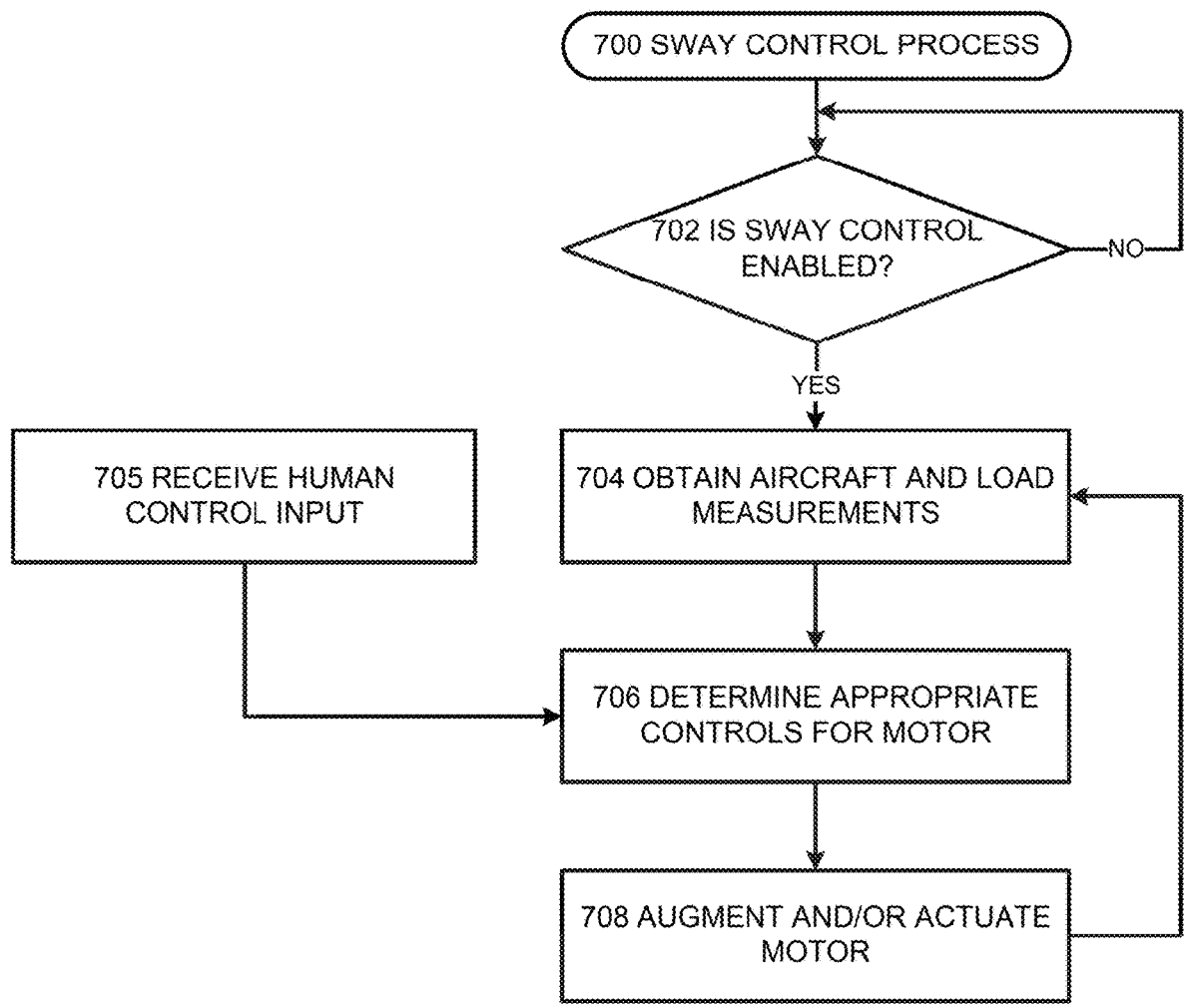
FIG. 7 illustrates an exemplary sway control process on a load being lifted to a helicopter. in accordance with aspects of the disclosure

FIG. 7 illustrates an exemplary sway control process on a load being lifted to a helicopter in accordance with aspects of the disclosure.

In particular, FIG. 7 illustrates a sway control process (Box 700) as a collection of blocks in a logical flow graph, which represent a sequence of operations that can be implemented in hardware, software, or a combination thereof. In the context of software, the blocks may represent computer-executable instructions that, when executed by one or more processors, perform the recited operations. Generally, computer-executable instructions may include routines, programs, objects, components, data structures, and/or the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure. Additionally, it should be noted that the sway control process (Box 700) is merely exemplary and may be modified consistent with the various aspects disclosed herein.

700 Sway Control Process

In particular, FIG. 7 illustrates the sway control process (Box 700). In one aspect, the sway control process (Box 700) reduces sway of the cable 104 and the load. In one aspect, the sway control process (Box 700) reduces oscillation of the cable 104 and the load. In one aspect, the sway control process (Box 700) reduces sway and oscillation of the cable 104 and the load.

In one aspect, the sway control process (Box 700) may be stored in the computer-readable media 606. In one aspect, the sway control process (Box 700) may be executed by the control system 609. In one aspect, the sway control process (Box 700) may be executed by the processor(s) 604.

702 is Sway Control Enabled?

The sway control process (Box 700) of the disclosure may include determining whether sway control is enabled (box 702). Moreover, one or more proceeding or subsequent processes may also be implemented with determining whether sway control is enabled (box 702) consistent with the disclosure. In one aspect, the sway control process (Box 700) may be enabled or disabled by the pilot. In this regard, the pilot may include an input device such as a switch or the like to manually enable the sway control process (Box 700) and/or disable the sway control process (Box 700). In this regard, the sway control process (Box 700) may be configured to be selectively turned off for mission types which require immediate extraction. In one aspect, the sway control process (Box 700) may be configured to be automatically turned off for mission types which require immediate extraction. In one aspect, the sway control process (Box 700) may be configured to be automatically turned on for mission types which require increased safety. In one aspect, the sway control process (Box 700) may be configured to be automatically turned on or turned off based on information obtained through artificial intelligence.

The artificial intelligence as described herein may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, neural networks, and/or the like. In one aspect, the artificial intelligence may be implemented by the control system 609, the processor(s) 604, or the like. In one aspect, the artificial intelligence may include inputs from one or more of the load measurement sensors such as the load cell 306, the cable movement measurement sensors such as the distance sensor 320, the cable-payout and direction detector 122 and/or the range-measuring equipment 120, the aircraft movement measurement Sensors Such as the Movement Sensor 322, Airspeed Measurement Sensors, Other Flight dynamics sensors, and/or the like.

704 Obtain Aircraft and Load Measurements

In one aspect, the sway control process (Box 700) may obtain aircraft and load measurements (Box 704). In one aspect, the sway control process (Box 700) may obtain aircraft and load measurements (Box 704) that include one or more of the outputs from the load measurement sensors such as the load cell 306, the cable movement measurement sensors such as the distance sensor 320, the cable-payout and direction detector 122 and/or the range-measuring equipment 120, the aircraft movement measurement sensors such as the movement sensor 322, the airspeed measurement sensors, other flight dynamics sensors, and/or the like.

705 Receive Human Control Input

In one aspect, the sway control process (Box 700) of the disclosure may include the hoist system 101 or other components operating to receive human control input (Box 705). The human input may be from movements of controls of an electronic interface from the pilot and/or crew. The movements of the controls may be converted to electronic signals by the hoist system 101. The human input may include an indication with respect to a lift direction, a lift velocity, and/or the like. In this regard, the hoist system 101 and the sway control process (Box 700) may be configured to modify existing human commands for hoist actuation and hoist movement in terms of scale input, and not directly actuate a hoist motor or movement otherwise. In one aspect, the hoist system 101 may be configured to replace the manual controls with an electronic interface. Further in this aspect, the movements of controls of the electronic interface may be converted to electronic signals and the hoist system 101 and/or the sway control process (Box 700) may determine how to operate the hoist system 101 to provide an ordered response to movements of the controls.

706 Determine Appropriate Controls for Motor

In one aspect, the sway control process (Box 700) may determine appropriate controls for the motor (Box 706). In one aspect, the sway control process (Box 700) may determine appropriate controls for the motor (Box 706) based at least in part on the output from the sensors and the human input. In one aspect, the sway control process (Box 700) may determine appropriate speed for the motor 110 currently lifting the load. In one aspect, the sway control process (Box 700) may determine appropriate deceleration for the motor 110 currently lifting the load. In one aspect, the sway control process (Box 700) may determine appropriate acceleration for the motor 110 currently lifting the load. In one aspect, the sway control process (Box 700) may determine appropriate velocity or reeling speed for the motor 110 currently lifting the load.

In one aspect, the sway control process (Box 700) may determine the appropriate control for the motor 110 currently lifting the load based on an algorithm operating as a function of the aircraft and load measurements obtained in box 704. In certain aspects, the algorithm may be expressed within a finite amount of space and time and in a well-defined formal language for calculating a function of the motor control. In certain aspects, the algorithm may start from an initial state and initial input of the aircraft and load measurements obtained in box 704. In certain aspects, the algorithm may implement a computation that, when executed, proceeds through a finite number of well-defined successive states, eventually producing control signals for controlling the motor 110. In one aspect, the sway control process (Box 700) may determine the appropriate control for the motor 110 currently lifting the load based on artificial intelligence as a function of the aircraft and load measurements obtained in box 704. In some aspects, the hoist system 101 and/or the sway control process (Box 700) may compare commanded inputs vs calculated controls for the motor 110. In one aspect, the hoist system 101 and/or the sway control process (Box 700) may utilize a comparator.

708 Augment and/or Actuate Motor

In one aspect, the sway control process (Box 700) may augment and/or actuate the motor 110 (box 708). In this regard, the sway control process (Box 700) may actuate the motor 110 based on the appropriate controls determined in box 706. In particular, the sway control process (Box 700) may actuate the motor 110 by sending control signals to the motor 110 to lift the load to reduce sway, to reduce oscillation, with a reduced sway, and/or reduced oscillation to ensure safe operation of the aircraft and safe lifting of the load.

Figure 8:
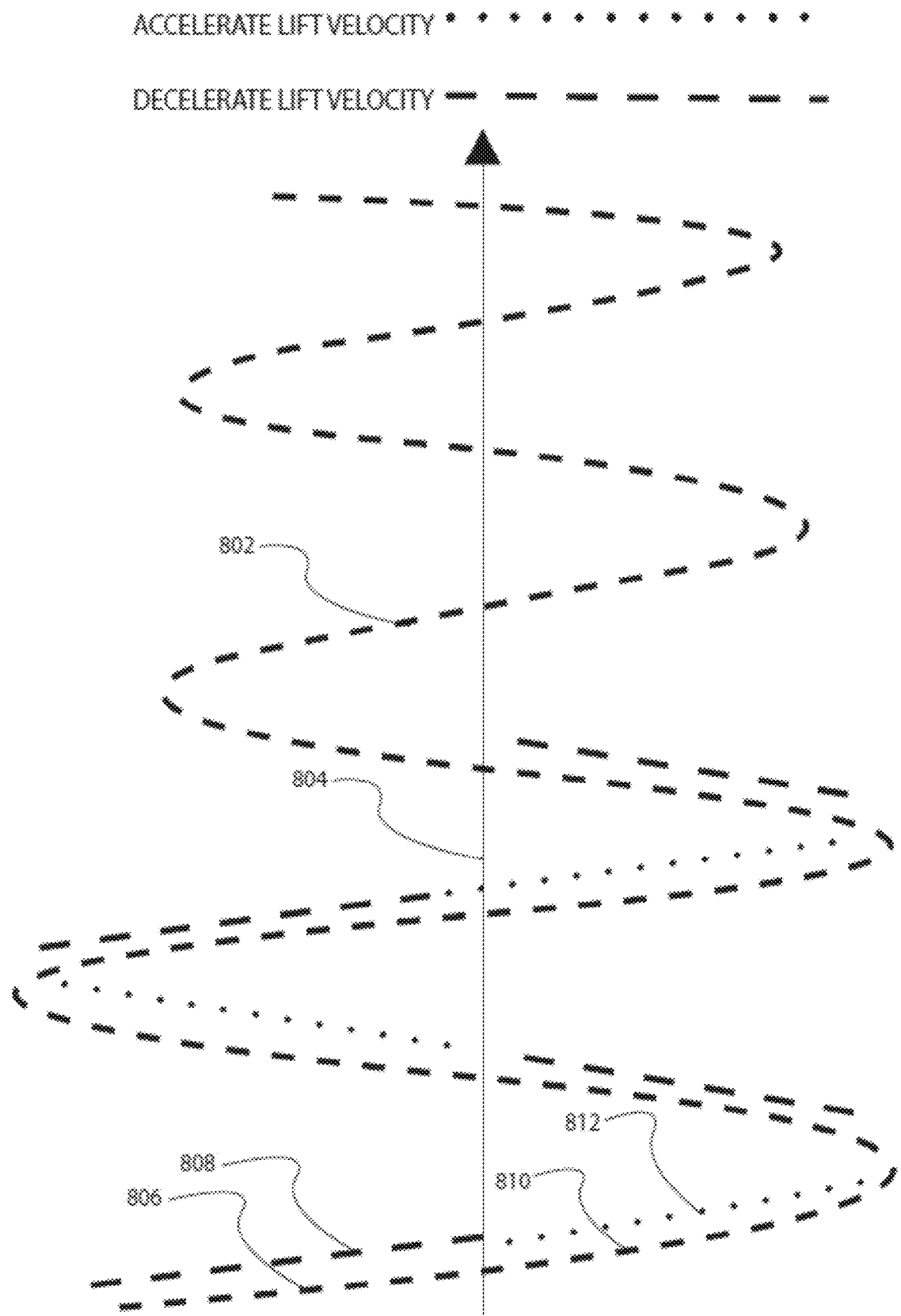
FIG. 8 illustrates an exemplary application of sway control on a load being lifted to a helicopter in accordance with aspects of the disclosure.

FIG. 8 illustrates an exemplary application of sway control on a load being lifted to a helicopter in accordance with aspects of the disclosure.

In particular, FIG. 8 illustrates an exemplary load path 802 that a load may take while being lifted by the hoist system 101 of the helicopter 100. As noted in FIG. 8, the load path 802 is swaying or oscillating under the helicopter 100 in comparison to a vertical center 804. The swaying or oscillating motion of the load may be due to the highly dynamic environment that includes or is subjected to various forces, movements, and/or the like.

While the load is being lifted to the helicopter 100, the hoist system 101 may obtain aircraft and load measurements that include one or more of the outputs from the load measurement sensors such as the load cell 306, the cable movement measurement sensors such as the distance sensor 320, the cable-payout and direction detector 122 and/or the range-measuring equipment 120, the aircraft movement measurement sensors such as the movement sensor 322, the airspeed measurement sensors, other flight dynamics sensors, and/or the like.

The hoist system 101 may determine appropriate controls for the motor 110 based at least in part on the output from the sensors and the human input. In one aspect, the sway control process (Box 700) may determine appropriate speed for the motor 110 currently lifting the load. In one aspect, the hoist system 101 may determine appropriate deceleration for the motor 110 currently lifting the load. In one aspect, the hoist system 101 may determine appropriate acceleration for the motor 110 currently lifting the load. In one aspect, the hoist system 101 may adjust reeling speed.

In one aspect, the hoist system 101 may determine the appropriate control for the motor 110 currently lifting the load based on the algorithm or the artificial intelligence as a function of the aircraft and load measurements received and the human input.

In one aspect, the hoist system 101 may actuate the motor 110 by sending control signals to the motor 110 to lift the load to reduce sway, to reduce oscillation, with a reduced sway, and/or reduced oscillation to ensure safe operation of the aircraft and safe lifting of the load.

In one aspect, when the hoist system 101 determines that the load is being subjected to sway and/or oscillation, the hoist system 101 may command the motor 110 to adjust the lift velocity of the load. The amount of adjustment to the motor 110 may be determined based on the algorithm or the artificial intelligence as a function of the aircraft and load measurements received as described herein. In particular, the hoist system 101 may actuate the motor 110 by sending control signals to the motor 110 to lift the load to reduce sway, to reduce oscillation, with a reduced sway, and/or reduced oscillation to ensure safe operation of the aircraft and safe lifting of the load.

In a particular exemplary aspect, when the hoist system 101 determines that the load is swinging toward 806 the vertical center 804, the hoist system 101 may command the motor 110 to accelerate the lift velocity 808 (as indicated by the dashed line) of the load. Thereafter, when the hoist system 101 determines that the load is swinging away 810 from the vertical center 804, the hoist system 101 may command the motor 110 to decelerate the lift velocity 812 (as indicated by the dotted line) of the load. The amount of acceleration, deceleration, and velocity of the lift provided by the motor 110 may be determined based on the algorithm or the artificial intelligence as a function of the aircraft and load measurements received as described herein. In particular, the hoist system 101 may actuate the motor 110 by sending control signals to the motor 110 to lift the load to reduce sway, to reduce oscillation, with a reduced sway, and/or reduced oscillation to ensure safe operation of the aircraft and safe lifting of the load. However, the disclosure is not limited to this exemplary aspect. In particular, the hoist system 101 may actuate the motor 110 to control lift velocity, acceleration, deceleration, and/or the like in response to an algorithm that may be more complex and the adjustments may be made at extremes of an arc of oscillation, a center of an arc of oscillation, and/or at locations between the extremes and center.

Figure 9:
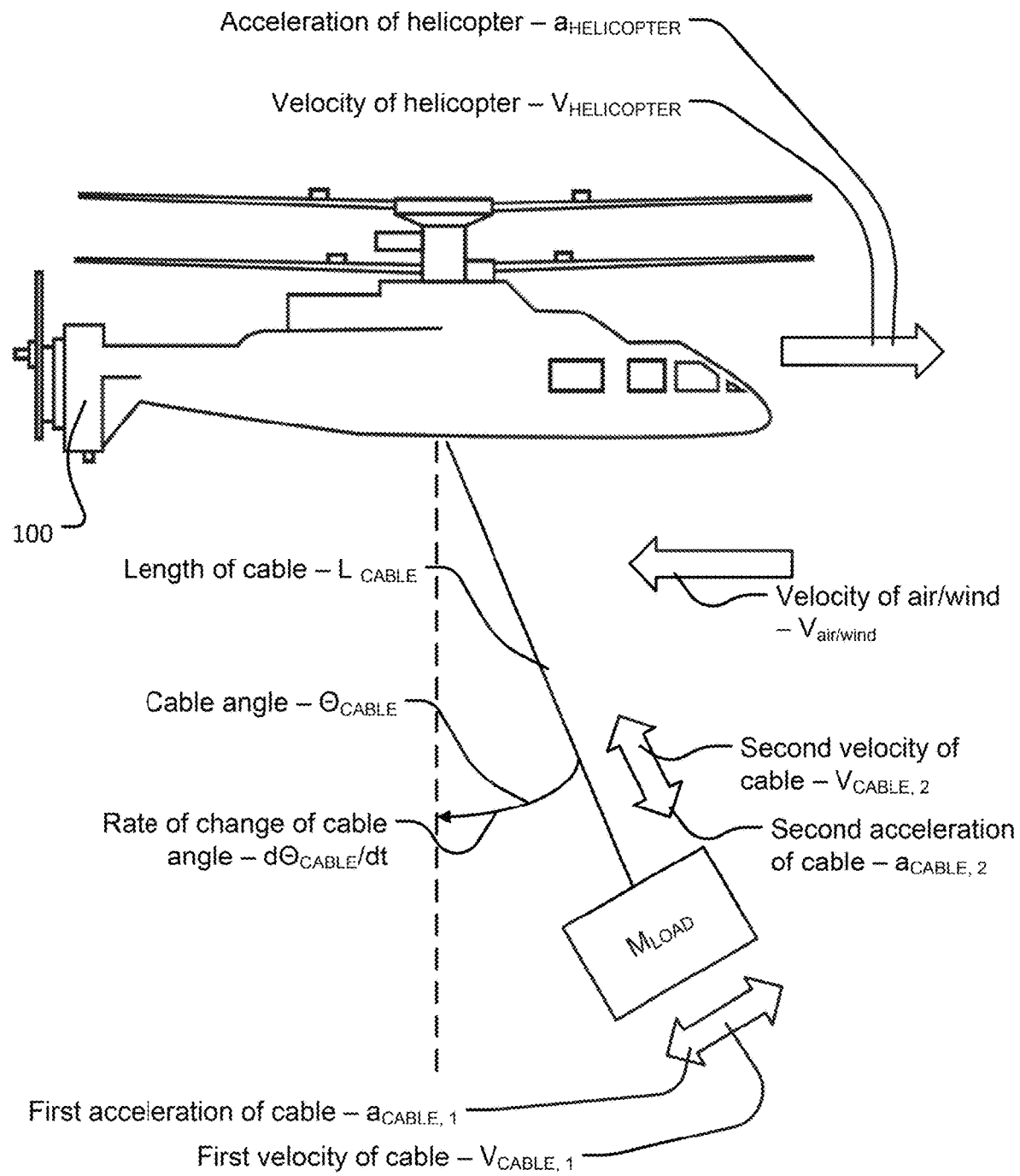
FIG. 9 illustrates a free body diagram of the helicopter hoist system according to an aspect of the disclosure.

FIG. 9 illustrates a free body diagram of the helicopter hoist system according to an aspect of the disclosure. In particular, FIG. 9 illustrates exemplary dynamic factors that are utilized by the hoist system 101 and the sway control process (Box 700) to reduce sway and/or oscillation. The dynamic factors include one or more of a Velocity of helicopter—$V_{HELICOPTER}$, an Acceleration of helicopter—$a_{HELICOPTER}$, a Velocity of air/wind—$V_{air/wind}$, a Cable angle—$\Theta_{CABLE}$, a Rate of change of cable angle—$d\Theta_{CABLE}/dt$, a Length of cable—$L_{CABLE}$, a First velocity of cable—$V_{CABLE, 1}$, a Second velocity of cable—$V_{CABLE, 2}$, a First acceleration of cable—$a_{CABLE, 1}$, a Second acceleration of cable—$a_{CABLE, 2}$, and a Mass of load—$M_{LOAD}$. Each of the dynamic factors being obtained by one or more sensors described in the disclosure. Thereafter, the sway control process (Box 700) operates based on one or more these dynamic factors obtained by the one or more sensors as described herein.

Accordingly, the disclosure has set forth a system and process to control the sway of the load and an associated portion of the lifting device to ensure safe operation of the aircraft and a safety of the load. In particular, the system and process of the disclosure limits uncontrolled oscillations and spin via the use of an electronic control module. Furthermore, the system and process of the disclosure has disclosed that oscillation may be mitigated by automatic adjustments to pay-in commands in order to remove human factors which may contribute to excessive oscillations.

Additionally, the various aspects of the disclosure are configured to ensure compliance with Federal Aviation Regulations (FARs) for external cargo operations. In particular, the various aspects of the disclosure are configured to ensure compliance with FARs for both "Human External Cargo" (HEC) and "Non Human External Cargo" (NHEC) including 14 C.F.R. 29.865 and in addition or in substitution of listed objects (load), which could be hoisted by aspects of the disclosure.

As may be appreciated by those skilled in the art, the illustrated structure is a logical structure and not a physical one. Accordingly, the illustrated modules can be implemented by employing various hardware and software components. In addition, two or more of the logical components can be implemented as a single module that provides functionality for both components. In one aspect, the components are implemented as software program modules.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (W-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. An aircraft hoist system, comprising:
   hoist equipment arranged in an aircraft, the hoist equipment including a motor, a cable, and a hook portion;
   at least one sensor configured to obtain measurements comprising at least one of following: a load measurement, a cable position movement measurement, a cable movement measurement, an aircraft movement measurement, and an airspeed measurement;
   a processor configured to analyze the measurements from the at least one sensor;
   the processor configured to determine motor control signals to control the motor based on an analysis of the measurements from the at least one sensor to reduce sway and/or oscillations of a load and the cable while lifting the load; and
   the processor configured to control the motor to lift the load with the cable based on the determined motor control signals,
   wherein the at least one sensor comprises at least one of the following: a load measurement sensor, a cable movement measurement sensor, a cable position measurement sensor, an aircraft movement measurement sensor, and an airspeed measurement sensor;
   wherein the processor is configured to control the motor to reduce sway and/or oscillations of the load and the cable while lifting the load with the cable based on the determined motor control signals that includes controlling the motor to have a determined lift velocity, a determined lift acceleration, and a determined lift deceleration;
   wherein sway comprises a movement of the load back and forth, side to side, and/or a combination thereof;
   wherein the measurements from at least one sensor comprises measuring with the at least one sensor at least one of following: a load measurement, a cable position movement measurement, a cable movement measurement;
   wherein the processor is configured to control the motor to accelerate the lift velocity when the load is swinging toward a vertical center; and
   wherein the processor is configured to control the motor to decelerate the lift velocity when the load is swinging away from a vertical center.

2. The aircraft hoist system according to claim 1, wherein the processor is configured to control the motor to lift the load with the cable based on the determined motor control signals that includes controlling the motor to adjust at least between extremes of an arc of oscillation and a center of an arc of oscillation the determined lift velocity, the determined lift acceleration, and the determined deceleration.

3. The aircraft hoist system according to claim 1, wherein the processor is configured to control the motor to lift the load with the cable based on the determined motor control signals that includes controlling the motor to adjust at least at extremes of an arc of oscillation the determined lift velocity, the determined lift acceleration, and the determined lift deceleration.

4. The aircraft hoist system according to claim 1, wherein the processor is configured to control the motor to lift the load with the cable based on the determined motor control signals that includes controlling the motor to adjust at least at extremes of an arc of oscillation the determined lift velocity, the determined lift acceleration, and the determined lift deceleration.

5. The aircraft hoist system according to claim 1, wherein the processor is configured to control the motor to lift the load with the cable based on the determined motor control signals that includes controlling the motor to adjust at least at extremes of an arc of oscillation the determined lift velocity, the determined lift acceleration, and the determined lift deceleration to reduce sway and/or oscillations.

6. An aircraft hoist system, comprising:
   hoist equipment arranged in an aircraft, the hoist equipment including a motor, a cable, and a hook portion;
   at least one sensor configured to obtain measurements comprising at least one of following: a load measurement, a cable position movement measurement, a cable movement measurement, an aircraft movement measurement, and an airspeed measurement;
   a processor configured to analyze the measurements from the at least one sensor;
   the processor configured to determine motor control signals to control the motor based on an analysis of the measurements from the at least one sensor to reduce sway and/or oscillations of a load and the cable while lifting the load; and
   the processor configured to control the motor to lift the load with the cable based on the determined motor control signals,
   wherein the at least one sensor comprises at least one of the following: a load measurement sensor, a cable movement measurement sensor, a cable position measurement sensor, an aircraft movement measurement sensor, and an airspeed measurement sensor;
   wherein the processor is configured to control the motor to reduce sway and/or oscillations of the load and the cable while lifting the load with the cable based on the determined motor control signals that includes controlling the motor to have a determined lift velocity, a determined lift acceleration, and a determined lift deceleration;
   wherein sway comprises a movement of the load back and forth, side to side, and/or a combination thereof;
   wherein the at least one sensor is configured to measure at least the cable position movement that includes a sway and/or oscillation of the load;
   wherein the processor is configured to control the motor to accelerate the lift velocity when the load is swinging toward a vertical center; and
   wherein the processor is configured to control the motor to decelerate the lift velocity when the load is swinging away from a vertical center.

7. The aircraft hoist system according to claim 6, wherein the at least one sensor is configured to measure at least the load measurement of the load being held by the cable.

8. The aircraft hoist system according to claim 6, wherein the processor is configured to control the motor to lift the load with the cable based on the determined motor control signals that includes controlling the motor to adjust at least at extremes of an arc of oscillation the determined lift velocity, the determined lift acceleration, and the determined lift deceleration.

9. The aircraft hoist system according to claim 6, wherein the processor is configured to control the motor to lift the load with the cable based on the determined motor control signals that includes controlling the motor to have a determined lift velocity, a determined lift acceleration, and a determined lift deceleration.

10. A method of controlling an aircraft hoist system, comprising:
    implementing hoist equipment in an aircraft, the hoist equipment including a motor, a cable, and a hook portion;
    obtaining measurements from at least one sensor by measuring with the at least one sensor at least one of following: a load measurement, a cable position movement measurement, an aircraft movement measurement, and an airspeed measurement;
    analyzing the measurements with a processor from the at least one sensor;
    determining motor control signals with the processor for controlling the motor based on an analysis of the measurements from the at least one sensor to reduce sway and/or oscillations of a load and the cable while lifting the load; and
    controlling the motor with the processor to lift the load with the cable based on the determined motor control signals,
    wherein the at least one sensor comprises at least one of the following: a load measurement sensor, a cable movement measurement sensor, a cable position measurement sensor, an aircraft movement measurement sensor, and an airspeed measurement sensor;
    wherein the controlling the motor to lift the load with the cable based on the determined motor control signals includes controlling the motor to reduce sway and/or oscillations of the load and the cable while lifting the load with the cable based on the determined motor control signals that includes controlling the motor to have a determined lift velocity, a determined lift acceleration, and a determined lift deceleration;
    wherein sway comprises a movement of the load back and forth, side to side, and/or a combination thereof;
    wherein the obtaining measurements from at least one sensor comprises measuring with the at least one sensor at least one of following: a load measurement, a cable position movement, a cable movement measurement;
    wherein the processor is configured to control the motor to accelerate the lift velocity when the load is swinging toward a vertical center; and
    wherein the processor is configured to control the motor to decelerate the lift velocity when the load is swinging away from a vertical center.

11. The method of controlling an aircraft hoist system according to claim 10, wherein the controlling the motor to lift the load with the cable based on the determined motor control signals includes controlling the motor to adjust at least between extremes of an arc of oscillation and a center of an arc of oscillation the determined lift velocity, the determined lift acceleration, and the determined lift deceleration.

12. The method of controlling an aircraft hoist system according to claim 10, wherein the controlling the motor to lift the load with the cable based on the determined motor control signals includes controlling the motor to adjust at least at extremes of an arc of oscillation the determined lift velocity, the determined lift acceleration, and the determined lift deceleration.

13. The method of controlling an aircraft hoist system according to claim 10, wherein the controlling the motor to lift the load with the cable based on the determined motor control signals includes controlling the motor to adjust at least at extremes of an arc of oscillation the determined lift velocity, the determined lift acceleration, and the determined lift deceleration.

14. The method of controlling an aircraft hoist system according to claim 10, wherein the controlling the motor to lift the load with the cable based on the determined motor control signals includes controlling the motor to adjust at least at extremes of an arc of oscillation the determined lift velocity, the determined lift acceleration, and the determined lift deceleration to reduce sway and/or oscillations.

15. A method of controlling an aircraft hoist system, comprising:
    implementing hoist equipment in an aircraft, the hoist equipment including a motor, a cable, and a hook portion;
    obtaining measurements from at least one sensor by measuring with the at least one sensor at least one of following: a load measurement, a cable position movement measurement, an aircraft movement measurement, and an airspeed measurement;
    analyzing the measurements with a processor from the at least one sensor;
    determining motor control signals with the processor for controlling the motor based on an analysis of the measurements from the at least one sensor to reduce sway and/or oscillations of a load and the cable while lifting the load; and
    controlling the motor with the processor to lift the load with the cable based on the determined motor control signals,
    wherein the at least one sensor comprises at least one of the following: a load measurement sensor, a cable movement measurement sensor, a cable position measurement sensor, an aircraft movement measurement sensor, and an airspeed measurement sensor;
    wherein the controlling the motor to lift the load with the cable based on the determined motor control signals includes controlling the motor to reduce sway and/or oscillations of the load and the cable while lifting the load with the cable based on the determined motor control signals that includes controlling the motor to have a determined lift velocity, a determined lift acceleration, and a determined lift deceleration;
    wherein sway comprises a movement of the load back and forth, side to side, and/or a combination thereof;
    wherein the obtaining measurements from at least one sensor comprises measuring with the at least one sensor at least the cable position movement that includes a sway and/or oscillation of the load;
    wherein the processor is configured to control the motor to accelerate the lift velocity when the load is swinging toward a vertical center; and wherein the processor is configured to control the motor to decelerate the lift velocity when the load is swinging away from a vertical center.

16. The method of controlling an aircraft hoist system according to claim 15, wherein the obtaining measurements from at least one sensor comprises measuring with the at least one sensor at least the load measurement of the load being held by the cable.

17. The method of controlling an aircraft hoist system according to claim 15, wherein the controlling the motor to lift the load with the cable based on the determined motor control signals includes controlling the motor to adjust at least at extremes of an arc of oscillation the determined lift velocity, the determined lift acceleration, and the determined lift deceleration.

18. An aircraft hoist system, comprising:
hoist equipment arranged in an aircraft, the hoist equipment including a motor, a cable, and a hook portion;
at least one sensor configured to obtain measurements comprising at least one of following: a load measurement, a cable position movement measurement, a cable movement measurement, an aircraft movement measurement, and an airspeed measurement;
a processor configured to analyze the measurements from the at least one sensor;
the processor configured to determine motor control signals to control the motor based on an analysis of the measurements from the at least one sensor to reduce sway and/or oscillations of a load and the cable while lifting the load; and
the processor configured to control the motor to lift the load with the cable based on the determined motor control signals,
wherein the at least one sensor comprises at least one of the following: a load measurement sensor, a cable movement measurement sensor, a cable position measurement sensor, an aircraft movement measurement sensor, and an airspeed measurement sensor;
wherein the processor is configured to control the motor to accelerate a lift velocity when the load is swinging toward a vertical center;
wherein the processor is configured to control the motor to decelerate the lift velocity when the load is swinging away from a vertical center; and
wherein sway comprises a movement of the load back and forth, side to side, and/or a combination thereof.

* * * * *